Figure 1:
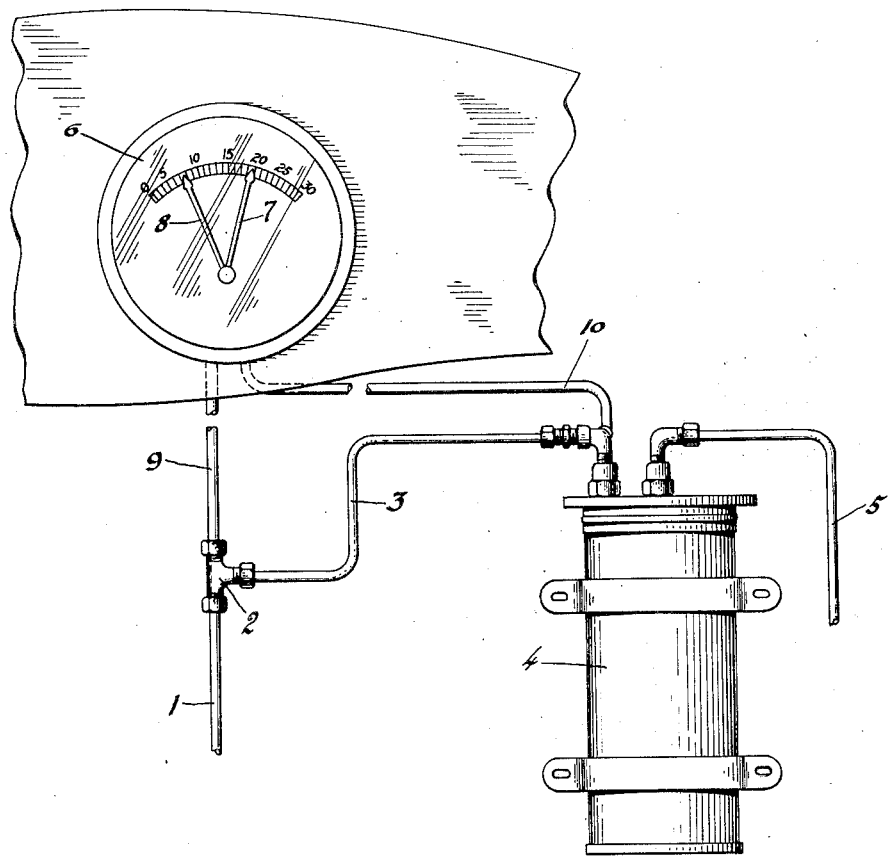

March 13, 1928.  
C. W. McKINLEY  
1,662,529  
MEANS FOR TESTING FILTERS  
Filed Oct. 27, 1926  
2 Sheets-Sheet 1

Charles W. McKinley, Inventor

By Blackmore, Spencer & Hull
Attorneys

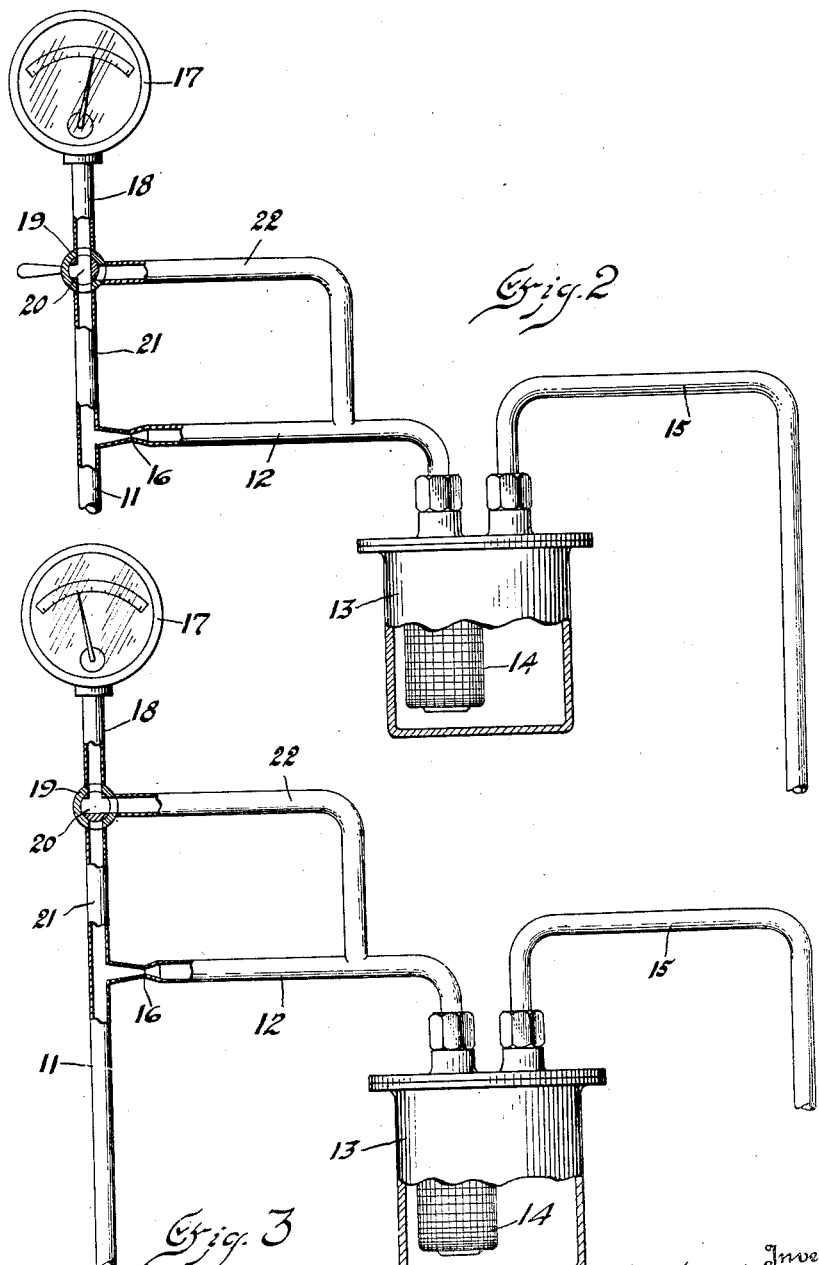

Patented Mar. 13, 1928.

1,662,529

UNITED STATES PATENT OFFICE.

CHARLES W. McKINLEY, OF FLINT, MICHIGAN, ASSIGNOR TO A. C. SPARK PLUG COMPANY, OF FLINT, MICHIGAN, A CORPORATION OF MICHIGAN.

MEANS FOR TESTING FILTERS.

Application filed October 27, 1926. Serial No. 144,497.

This invention relates to filters and more particularly to a method and means for testing the efficiency of the filter.

The invention is especially usable and will be herein described in connection with common types of oil filters for automobile engines, but obviously may be employed with other types of filtering apparatus wherein the fluid to be filtered is delivered under pressure. After filters are in use for a time, and the straining or filtering action has collected a quantity of dirt and foreign material, such dirt tends to obstruct the passage of the fluid being cleansed, and necessitates removal of the accumulated dirt or replacement of the filtering agent.

One of the objects of the present invention is to enable the ascertainment of the condition of the filter at any time, without disassembling the parts, and to provide a constantly visible indication.

Other incidental objects will appear from the following specification and the accompanying drawings, wherein the relation of parts are shown somewhat diagrammatically, Figure 1 illustrating one arrangement, and Figures 2 and 3 a modified form in two different positions of adjustment.

Referring first of all to the preferred form shown in Figure 1, the reference character 1 indicates a supply line of conduit for lubricating oil leading from a pressure pump. The T-coupling 2 connects with the conduit 3 leading to the inlet of the filter housing 4. Filtered oil returns to the engine crankcase thru the conduit 5. In order to prevent an excessive flow thru the filter, a restriction is provided, preferably in the T-coupling neck leading to the conduit 3, limiting oil flow to a predetermined amount, as will be more fully referred to later. Upon the instrument board 6 of the automobile will be located a duplex pressure indicating gage 6ª having two pointers or fingers 7 and 8 reading on a common scale. The finger 7 is connected thru conduit 9 to the oil system to indicate the pressure in front of the limiting restriction in the T-coupling 2, while the finger 8 is connected by conduit 10, to give a reading of back pressure, created by filter resistance due to clogging. So long as the filter is active, the pressure in the system will exceed the back pressure or filter resistance and the readings as shown by fingers 7 and 8 will be unequal. However, when the filter becomes entirely clogged, and the flow completely stopped, the pressure thruout the entire system is uniform, and both fingers 7 and 8 will give the same gage reading. Thus, the automobile driver knows at all times the condition of his oil system and filter, by simply glancing at the instrument board gage and observing how closely the two fingers approach each other.

It is quite obvious that, instead of the duplex gage, two separate gage units could be employed connected one to the line 9 and the other to conduit 10 for comparison, while on the other hand a single gage will serve the purpose by employing a multiple valve as shown in Figures 2 and 3. In Figures 2 and 3, the pressure supply line 11 is connected by the conduit 12 with the filter, conventionally shown as consisting of a housing 13, having therein a strainer or filtering element 14. As the oil passes thru the strainer 14, into the housing 13, the sediment is deposited or retained in the strainer, while the oil leaves the housing thru the outlet or conduit 15 leading to the crankcase. The restricted passageway 16 limits oil flow according to a predetermined amount and at the same time prevents excessive pressure at the filter and consequent packing of the deposition of filtered material. That is, with the limited flow, sediment is more or less loosely suspended, whereas if the full force of the pressure were to act on the filter, the sediment would be packed tightly and driven into the filtering element, materially shortening the period of usefulness. The scale or pressure indicator 17 has a connection 18 with a multiple valve, consisting of the housing 19, and a three way element 20, revolvably adjustable within the housing 19. The conduit 21 connects the valve with the pressure supply line, and the conduit 22 connects the valve with the inlet conduit 12, between the restriction and filter.

It will, of course, be understood that pressure in the supply line varies with pump operation, dependent on engine speed. To test the filter with the construction of Figures 2 and 3, the engine is set at a constant speed so that pump pressure will be uniform. With the valve set in the position of Figure 2, pressure in the system resisted by the restriction is gaged. Upon turning the valve to the Figure 3 position, back pressure or filter resistance on the opposite side of the restriction is measured. With a clean filter, the pressure in the supply line, before the restriction, will be greater than the resistance of the filter to the limited flow permitted by the restriction. As the filter becomes clogged, its resistance increases, correspondingly bringing the two readings closer to each other. The degree of clogging determines the variation in the respective readings, and a comparison of the two measurements indicates the extent of such clogging. Should the readings on opposite sides of the restriction approach or equal each other, the observer is cautioned to give the necessary attention.

The principle of operation of the constructions described is the same in each instance, the only variations being the arrangement of different types of gage units.

From the above description, it will be apparent that there is provided a device to enable ascertainment of filter efficiency, without necessity for dismantling the system.

While the arrangement of parts and method of use have been described more or less specifically, there is no intention to limit the invention to the exact details, but such modifications may be made as come within the scope of the appended claims.

Having described the invention, I claim:

1. Means for testing filters, including in combination, a supply conduit for fluid under pressure leading to a filter to be tested, the clogging of which filter offers resistance to the flow of fluid, means to restrict the flow of fluid to the filter, and thereby offer resistance to such flow, and means to gage the respective resistances to determine filter activity.

2. Means for testing filters, including in combination, a conduit for delivering liquid under pressure to a filter to be tested, said conduit offering resistance to flow greater than the resistance offered by the filter when the latter is clean, and means for comparing the pressures applied to the liquid entering the conduit and to the liquid at the entrance to the filter.

3. Means for testing filters, including in combination, a restricted inlet to the filter to be tested, a supply conduit for fluid under pressure communicating with said restricted inlet, a back pressure conduit leading from the filter, and means to gage the pressures in the respective conduits.

4. Means for testing filters, including in combination, a conduit for fluid under pressure, a conduit leading to the filter to be tested, having a restricted mouth communicating with the pressure conduit, such restricted mouth maintaining pressure within the pressure conduit, means to gage such pressure, and means to gage the resistance to the flow of fluid through the filter.

5. Means for testing filters, including in combination, an inlet conduit for the filter to be tested having a restricted passageway, a supply conduit for fluid under pressure communicating with said inlet conduit, a back pressure conduit located in advance of the restricted passageway, a back pressure conduit located between the restricted passageway and the filter, the restricted passageway permitting a limited flow of fluid and resulting in back pressure within the first mentioned back pressure conduit, the gradual clogging of the filter and resistance to fluid flow resulting in back pressure within the second mentioned back pressure conduit, and means to gage the respective back pressures to determine by comparison the efficiency of the filter.

6. Means for testing filters, including in combination, a supply conduit for fluid under pressure communicating with the filter to be tested, a back pressure conduit for the filter, the resistance to the flow of fluid through the filter due to clogging creating back pressure within the conduit corresponding inversely to the flow through the filter, means to resist the fluid flow to create back pressure in the supply conduit and means to measure the respective back pressures for comparison to determine the condition of the filter.

7. Means for testing filters, including in combination, a conduit for fluid under pressure leading to the filter to be tested, a restriction in said conduit offering resistance to the fluid flow, a multiple valve, conduits leading from opposite sides of said restriction to said valve, and a pressure gage alternately connected by said valve with the respective conduits to indicate pressures before and after the restriction for ascertaining by comparison the clogged condition of the filter.

8. Means for testing filters, including in combination, an inlet conduit for the filter to be tested having a restricted passageway, a supply conduit for fluid under pressure communicating with said inlet conduit, a back pressure conduit located in advance of the restricted passageway, such restricted passageway resulting in back pressure within said back pressure conduit, a back pressure conduit located between the restricted passageway and the filter, the resistance of the filter to the flow resulting in back pressure within the second mentioned back pressure conduit, a gage, and a multiple valve connected with said gage and alternately communicating with the respective back pressure conduits to measure the back pressure within such conduits.

9. Means for testing filters, including in combination, a conduit for fluid under pressure leading to the filter to be tested, a restriction in said conduit limiting fluid flow, an instrument board, and pressure actuated means on said board, arranged to indicate fluid pressures on opposite sides of said restriction independently of each other.

In testimony whereof I affix my signature.

CHARLES W. McKINLEY.